(12) United States Patent
Rakshit et al.

(10) Patent No.: US 10,174,265 B2
(45) Date of Patent: Jan. 8, 2019

(54) PROCESS FOR CO-GASIFICATION OF TWO OR MORE CARBONACEOUS FEEDSTOCKS AND APPARATUS THEREOF

(75) Inventors: Pranab Kumar Rakshit, Greater Noida (IN); Ravi Kumar Voolapalli, Greater Noida (IN); Pintu Maity, Greater Noida (IN)

(73) Assignee: BHARAT PETROLEUM CORPORATION LIMITED, Mumbai (IN)

( * ) Notice: Subject to any disclaimer, the term of this patent is extended or adjusted under 35 U.S.C. 154(b) by 263 days.

(21) Appl. No.: 14/119,615

(22) PCT Filed: Dec. 29, 2011

(86) PCT No.: PCT/IN2011/000900
§ 371 (c)(1),
(2), (4) Date: Nov. 22, 2013

(87) PCT Pub. No.: WO2012/168945
PCT Pub. Date: Dec. 13, 2012

(65) Prior Publication Data
US 2014/0090298 A1    Apr. 3, 2014

(30) Foreign Application Priority Data

Jun. 10, 2011 (IN) .......................... 1700/MUM/2011

(51) Int. Cl.
*C10J 3/66* (2006.01)
*F23G 5/027* (2006.01)
(Continued)

(52) U.S. Cl.
CPC . *C10J 3/66* (2013.01); *C10J 3/14* (2013.01); *C10J 3/721* (2013.01); *F23G 5/027* (2013.01);
(Continued)

(58) Field of Classification Search
CPC ........ C10J 2300/0989; C10J 2300/1253; C10J 2300/1618; C10J 3/721; C07C 29/1518
See application file for complete search history.

(56) References Cited

U.S. PATENT DOCUMENTS 3,703,052 A * 11/1972 Linden .................. C10G 1/002
208/423
3,708,269 A * 1/1973 Linden ...................... C01B 3/36
48/197 R
(Continued)

FOREIGN PATENT DOCUMENTS

WO    2008/033812 A2    3/2008
WO    2009/091325 A1    7/2009
WO    WO2009145724 A2    12/2009

*Primary Examiner* — Imran Akram
(74) *Attorney, Agent, or Firm* — Seed IP Law Group LLP (57) ABSTRACT

The present invention relates to a process for co-gasification of two or more carbonaceous feedstock, said process comprising combusting a first carbonaceous feedstock having high calorific value with low ash and high hydrogen content, to produce a heated effluent; carrying the heated effluent to second reactor where the heated effluent reacts with a second carbonaceous feedstock, having low calorific value with high ash and low hydrogen content, to produce synthesis gas. The present invention also relates to an apparatus for co-gasification of two or more carbonaceous feedstock, comprising a first reactor (3), having a first feedstock inlet port (1), a oxygen or air inlet port (2), a steam inlet port (9), a ash removal port (7), and a solid recycle port (6); a first cyclone separator (5) connected to the first reactor (3) through a first cyclone separator inlet port (4); a second reactor (16), having a second feedstock inlet port (10), and a ash removal port (15), the second reactor is connected to the first cyclone separator (5) through a gaseous inlet port (8); and a second cyclone separator (12), having a fine particles removal port (13), and an effluent port (14), (Continued)

wherein the second cyclone separator is connected to the second reactor through a second cyclone separator inlet port (11).

12 Claims, 4 Drawing Sheets

(51) Int. Cl.
    *F23G 5/30*              (2006.01)
    *C10J 3/72*              (2006.01)
    *C10J 3/14*              (2006.01)

(52) U.S. Cl.
    CPC ........... *F23G 5/30* (2013.01); *C10J 2300/093* (2013.01); *C10J 2300/0913* (2013.01); *C10J 2300/0916* (2013.01); *C10J 2300/0943* (2013.01); *C10J 2300/0969* (2013.01); *C10J 2300/0976* (2013.01); *C10J 2300/1215* (2013.01); *C10J 2300/1253* (2013.01); *F23G 2202/00* (2013.01); *F23G 2203/501* (2013.01); *F23G 2203/503* (2013.01); *F23G 2900/50001* (2013.01); *Y02P 20/145* (2015.11)

(56) References Cited

U.S. PATENT DOCUMENTS

| | | | |
|---|---|---|---|
| 4,013,428 A | | 3/1977 | Babbitt |
| 4,347,064 A | * | 8/1982 | Reh ............................ C10J 3/54 |
| | | | 201/31 |
| 4,444,568 A | * | 4/1984 | Beisswenger .............. C10J 3/54 |
| | | | 48/197 R |
| 4,872,886 A | | 10/1989 | Henley et al. |
| 5,895,508 A | * | 4/1999 | Halow ........................ C10J 3/26 |
| | | | 48/63 |
| 7,503,945 B2 | | 3/2009 | Hiltunen et al. |
| 7,740,672 B2 | | 6/2010 | Sprouse |
| 8,349,504 B1 | * | 1/2013 | Radovich ................... C01B 3/32 |
| | | | 429/416 |
| 2003/0046868 A1 | | 3/2003 | Lewis |
| 2004/0244289 A1 | * | 12/2004 | Morozumi .............. C01B 3/323 |
| | | | 48/77 |
| 2005/0256212 A1 | * | 11/2005 | Norbeck .................... C01B 3/34 |
| | | | 518/702 |
| 2006/0150510 A1 | * | 7/2006 | Hiltunen ................... C10J 3/482 |
| | | | 48/210 |
| 2008/0081844 A1 | * | 4/2008 | Shires ........................ C01B 3/36 |
| | | | 518/703 |
| 2008/0155899 A1 | | 7/2008 | Ramamurthy |
| 2008/0275278 A1 | | 11/2008 | Clark |
| 2009/0049748 A1 | * | 2/2009 | Day ........................ C01B 3/342 |
| | | | 48/77 |
| 2009/0156695 A1 | | 6/2009 | Young |
| 2010/0146856 A1 | * | 6/2010 | Zamansky ............... C10J 3/466 |
| | | | 48/77 |
| 2010/0146857 A1 | * | 6/2010 | Zamansky ............... C10J 3/466 |
| | | | 48/197 FM |
| 2010/0146858 A1 | * | 6/2010 | Zamansky ............... C10J 3/466 |
| | | | 48/210 |
| 2010/0292350 A1 | * | 11/2010 | Robinson ................ C01B 31/18 |
| | | | 518/700 |
| 2011/0022547 A1 | * | 1/2011 | Ramamurthy ........... C10G 1/02 |
| | | | 705/500 |
| 2011/0135556 A1 | * | 6/2011 | Neumann ........... C07C 29/1518 |
| | | | 423/326 |
| 2013/0056685 A1 | * | 3/2013 | Badhe ........................ C10J 3/18 |
| | | | 252/373 |
| 2013/0312328 A1 | * | 11/2013 | Xu ........................... C10J 3/482 |
| | | | 48/77 |

* cited by examiner

PROCESS FOR CO-GASIFICATION OF TWO OR MORE CARBONACEOUS FEEDSTOCKS AND APPARATUS THEREOF

TECHNICAL FIELD

The present invention relates to a process of co-gasification of two or more carbonaceous feedstock to produce synthesis gas.

The present invention further relates to an apparatus for co-processing of two or more carbonaceous feedstock to produce synthesis gas.

BACKGROUND

Gasification is a partial oxidation process wherein carbon feedstock are converted into CO and $H_2$ (often known as synthesis gas) in presence of steam and oxygen. These reactions occur typically above 800 degree C. High reaction temperatures and steam partial pressures are often preferred for maximizing $H_2$ production. Currently there are three major types of gasification systems. These are Entrained bed, fluidized bed and Moving bed gasifiers. The entrained bed system operates at temperatures above 1250 degree C., while in fluid bed and moving bed gasifiers the temperatures are normally below 1100 degree C. Accordingly, the solids residence time is much higher in these systems.

Though all gasification systems convert solid carbonaceous material into gaseous form, choosing gasifier configuration based on the properties of feedstock can result in improved operational performance and higher conversion efficiency. For example, high ash coals are often advantageously gasified in moving bed systems to achieve higher cold gas efficiencies. Similarly, petroleum coke is typically gasified in entrained beds to overcome the reactivity issues at low temperatures. Also the size of the particles used in these gasifiers differs significantly to suit the flow pattern and operating conditions employed in the gasifier. Similarly in entrained bed gasifiers the temperatures are typically maintained above the ash fusion temperatures. Therefore physical properties like grindability index, ash melting temperatures etc play important role in deciding optimal gasifier choice.

The syn gas quality and its calorific value are the vital issues of gasification, which is mainly governed by the type of feedstock used and operating conditions employed. Since feedstock plays an important role, several studies focused on co-processing of coal, pet coke, biomass, heavy liquids etc. However, co processing two or more types of feedstocks in a single gasifier configuration can be inefficient compared to co processing in multi stage gasifier configuration as single system can not exploit all the beneficial characteristics of the feed.

The idea of gasifying carbonaceous material in different stages has been reported in many patents and patent applications. However, most of these technologies utilize two stage systems for increasing the carbon conversion by converting the unconverted carbon of first stage in the second stage or emphasize on effectively removing tar from gasification system. U.S. Pat. No. 7,740,672, discloses a two stage gasifier wherein the two stages of the gasifier are connected to a cyclone separator in between and the cold gas efficiency of the effluent gases is expected to be around 90%.

U.S. Pat. No. 4,872,886 discloses a two stage gasification process where a part of the coal feed is reacted in the presence of steam and in an oxygen rich environment to produce syngas at a very high temperature. This hot syngas is then contacted with a second part of coal slurry where further gasification reaction takes place. Unconverted coal is recycled back to the first stage for combustion. By doing this high calorific value syngas is generated with minimum energy loss. This increases the overall efficiency of the process. But this process only discloses the gasification of a single feedstock in two stages. In second stage the unconverted feedstock get reacted with the syn gas produced in the first stage to give synthesis gas.

U.S. Pat. No. 7,503,945 describes a two stage gasification process wherein the solid effluents coming out of the first stage gasifier are combusted in an ash reactor. The hot gases coming out of the ash reactor is fed to a cyclone separator wherein sufficient amount of ash particles are allowed to pass along with gas effluent which in turn mixes with the gaseous effluent of the first stage. By doing this tar coming out of the first stage is being picked up by ash and taken to the ash reactor.

The idea of supplying the heat for carrying out endothermic gasification reaction using the sensible heat of steam has been disclosed in WO2009145724. This application discloses a two step gasification process for converting carbonaceous feedstock into gaseous syngas by supplying sensible heat from external sources.

None of these two stage processes discuss the preferential combustion in case of co-gasification of two or more carbonaceous feedstocks. United States patent application 2010/146856 suggests carrying out gasification in two zones through preferential gasification of high calorific material in zone 1 and low calorific material in zone 2. However, this invention does not teach any optimum scheme for reduced oxygen consumption while handling feedstock with differing ash, hydrogen and calorific content. Hydrogen rich feedstocks such as methane, petroleum residue consume less oxygen and release higher amount of gasification reactants such as $H_2O$ and $CO_2$. The feedstock that are rich in hydrogen are high in H/C ratio, hence produces more stoichiometric $H_2O$ during combustion than hydrogen lean feedstock. As the kinetics of steam gasification are much faster than the $CO_2$ gasification, preferential combustion of high hydrogen content feeds enables faster kinetic environment for carbon conversion. Further, if the oxygen supply is limited to the extent of gasification conditions, the calorific content of the fuel is not fully available for driving the endothermic gasification reactions. This is because under high temperature conditions both CO and $CO_2$ are produced leading to less enthalpy release as energy is locked in the form of CO and $H_2$. $H_2$ is produced from CO and $H_2O$ through shift reaction. As a result the mixed temperatures achieved while co-gasification are lower. Therefore stoichiometric gasification of high calorific value fuel is not optimal for creating high temperature, steam rich gasification environment.

Ash content in the feed consumes significant energy which is often wasted in the form of heat of fusion or sensible heat. This is more so when combustion is carried out in a separate reactor where the scope for sensible heat transfer from ash is limited. In contrast, when low ash feedstocks are burnt the temperature rise is much higher due to absence of high ash levels. As a result all the energy can be efficiently captured in the form of high enthalpy stream mainly consisting of $H_2O$ and $CO_2$.

Further, the advantages of segregated treatment are not fully exploited as these feedstocks are completely mixed in a single reactor system.

To improve the system further, the present invention includes preferential combustion of a carbonaceous material which has higher calorific content preferably higher hydrogen and low ash content calorific value in a reactor and transferring this energy using steam for driving the gasification of lower calorific value ash rich and hydrogen lean carbonaceous feed in a separate reactor. More particularly, the present invention relates to a two stage gasification system and process for simultaneous or co-gasification of two or more carbonaceous feedstock.

SUMMARY

The present invention provides a process for co-gasification of two or more carbonaceous feedstock, said process comprising: combusting a first carbonaceous feedstock having high calorific value with low ash and high hydrogen content, in presence of steam, with an amount of oxygen to produce a heated effluent; carrying the heated effluent to a second reactor wherein said heated effluent reacts with a second carbonaceous feedstock, having low calorific value with high ash and low hydrogen content, to produce synthesis gas.

The present invention further provides an apparatus for co-gasification of two or more carbonaceous feedstock, said apparatus comprising: a first reactor (3), having a first feedstock inlet port (1), an oxygen or air inlet port (2), a steam inlet port (9), an ash removal port (7), and a solid recycle port (6); a first cyclone separator (5) connected to the first reactor (3) through a first cyclone separator inlet port (4); a second reactor (16), having a second feedstock inlet port (10), and an ash removal port (15), wherein the second reactor is connected to the first cyclone separator (5) through a gaseous inlet port (8); and a second cyclone separator (12), having a fine particles removal port (13), and an effluent port (14), wherein the second cyclone separator is connected to the second reactor through a second cyclone separator inlet port (11).

These and other features, aspects, and advantages of the present subject matter will become better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWINGS

The above and other features, aspects, and advantages of the subject matter will become better understood with regard to the following description, appended claims, and accompanying drawings where:

FIG. 1 is a schematic illustration of the process and apparatus for co-gasification of two or more carbonaceous feedstock. In this figure the reference numerals represents: first feedstock inlet port (1), oxygen or air inlet port (2), first reactor (3), steam inlet port (9), ash removal port (7), solid recycle port (6), first cyclone separator inlet port (4), first cyclone separator (5), second reactor (16), second feedstock inlet port (10), ash removal port (15), gaseous inlet port (8), second cyclone separator (12), fine particle removal port (13), second cyclone separator inlet port (11), and effluent port (14).

DETAILED DESCRIPTION OF THE INVENTION

The present invention provides a process for co-gasification of two or more carbonaceous feedstock, said process comprising: combusting a first carbonaceous feedstock having high calorific value with low ash and high hydrogen content, in presence of steam, with an amount of oxygen to produce a heated effluent; carrying the heated effluent forward so that the heated effluent reacts with a second carbonaceous feedstock, having low calorific value with high ash and low hydrogen content, to produce synthesis gas.

The present invention further provides a process for co-gasification of two or more carbonaceous feedstock, said process comprising: combusting a first carbonaceous feedstock having high calorific value with low ash and high hydrogen content, in presence of steam, with an amount of oxygen to produce a heated effluent; carrying the heated effluent to a second reactor wherein said heated effluent reacts with a second carbonaceous feedstock, having low calorific value with high ash and low hydrogen content, to produce synthesis gas.

An embodiment of the present invention provides a process for co-gasification of two or more carbonaceous feedstock, said process comprising: combusting a first carbonaceous feedstock having high calorific value with low ash and high hydrogen content selected from the group consisting of Petcoke, low ash Coal, Natural gas, Liquefied petroleum gas, synthesis gas, coal and oil emulsions or mixtures thereof, in presence of steam, with an amount of oxygen to produce a heated effluent; carrying the heated effluent to a second reactor wherein said heated effluent reacts with a second carbonaceous feedstock, having low calorific value with high ash and low hydrogen content, to produce synthesis gas.

Another embodiment of the present invention provides a process for co-gasification of two or more carbonaceous feedstock, said process comprising: combusting a first carbonaceous feedstock having high calorific value with low ash and high hydrogen content, in presence of steam, with an amount of oxygen to produce a heated effluent; carrying the heated effluent to a second reactor wherein said heated effluent reacts with a second carbonaceous feedstock, having low calorific value with high ash and low hydrogen or high oxygen content is selected from the group consisting of Indian Coal, high ash coal and Biomass or mixtures thereof, to produce synthesis gas.

Further an embodiment of the present invention provides a process for co-gasification of two or more carbonaceous feedstock, said process comprising: combusting a first carbonaceous feedstock having high calorific value with low ash and high hydrogen content, in presence of steam, with stoichiometric oxygen (carbonaceous feedstock/oxygen), or slightly excess or slightly less amount than stoichiometric oxygen to produce a heated effluent; carrying the heated effluent to a second reactor wherein said heated effluent reacts with a second carbonaceous feedstock, having low calorific value with high ash and low hydrogen or high oxygen content, to produce synthesis gas.

The amount of oxygen used for combustion of first carbonaceous feedstock is in the range of ±5 to ±20% by weight than the stoichiometric oxygen.

The oxygen required for the combustion of the high calorific value feedstock to produce heated effluent in the present invention can enter the system at any stage; however the combustion of the high calorific value feedstock has to be completed just before the heated effluent enter the second stage reactor so that maximum heat is produced with the minimal input oxygen. Similarly, several schemes can be devised for combusting the CO and $H_2$ produced from the first stage gaseous streams for gradual release of heat and minimal overall oxygen consumption.

Still another embodiment of the present invention provides a process for the co-gasification of two or more carbonaceous feedstock, said process comprising: combusting a first carbonaceous feedstock having high calorific value with low ash and high hydrogen content, in presence of steam, with an amount of oxygen which is preheated at a temperature in the range of 200 deg C. to 400 deg C. to produce a heated effluent; carrying the heated effluent to a second reactor wherein said heated effluent reacts with a second carbonaceous feedstock, having low calorific value with high ash and low hydrogen content, to produce synthesis gas.

Another embodiment of the present invention provides a process for the co-gasification of two or more carbonaceous feedstock, said process comprising: combusting a first carbonaceous feedstock having high calorific value with low ash and high hydrogen content, at a temperature in the range of 800 deg C. to 2000 deg C., in presence of steam, with an amount of oxygen to produce a heated effluent; carrying the heated effluent to a second reactor wherein said heated effluent reacts with a second carbonaceous feedstock, having low calorific value with high ash and low hydrogen content, to produce synthesis gas.

Yet another embodiment of the present invention provides a process for the co-gasification of two or more carbonaceous feedstock, said process comprising: combusting a first carbonaceous feedstock having high calorific value with low ash and high hydrogen content, at a temperature in the range of 900 deg C. to 1800 deg C., in presence of steam, with an amount of oxygen to produce a heated effluent; carrying the heated effluent to a second wherein said heated effluent reacts with a second carbonaceous feedstock, having low calorific value with high ash and low hydrogen content, to produce synthesis gas.

Yet another embodiment of the present invention provides a process for the co-gasification of two or more carbonaceous feedstock, said process comprising: combusting a first carbonaceous feedstock having high calorific value with low ash and high hydrogen content, at a pressure in the range of 1 bar to 100 bars, in presence of steam, with an amount of oxygen to produce a heated effluent; carrying the heated effluent to a second reactor wherein said heated effluent reacts with a second carbonaceous feedstock, having low calorific value with high ash and low hydrogen content, to produce synthesis gas.

Further an embodiment of the present invention provides a process for the co-gasification of two or more carbonaceous feedstock, said process comprising: combusting a first carbonaceous feedstock having high calorific value with low ash and high hydrogen content, at a pressure in the range of 1 bar to 90 bars, in presence of steam, with an amount of oxygen to produce a heated effluent; carrying the heated effluent to a second reactor wherein said heated effluent reacts with a second carbonaceous feedstock, having low calorific value with high ash and low hydrogen content, to produce synthesis gas.

The combustion of the high calorific value feedstock to produce heated effluent in the present invention refers to the complete combustion of the feedstock to produce at least 95% of $CO_2+H_2O$, less than 5% of $CO+H_2$ and residuary amount (less than 1%) of oxygen.

The portion of CO and $H_2$ which is present in the heated effluent maintains the temperature of the first stage reactor, and this CO and $H_2$ can be burnt before entering the second stage reactor.

Yet another embodiment of the present invention provides a process for the co-gasification of two or more carbonaceous feedstock, wherein the heated effluent comprises heat, super heated steam, and hot gases.

Still another embodiment of the present invention provides a process for co-gasification of two or more carbonaceous feedstock, said process comprising: combusting a first carbonaceous feedstock having high calorific value with low ash and high hydrogen content, in presence of steam, with an amount of oxygen to produce a heated effluent; carrying the heated effluent to a fluid bed reactor wherein said heated effluent reacts with a second carbonaceous feedstock, having low calorific value with high ash and low hydrogen content, to produce synthesis gas.

Another embodiment of the present invention provides a process for co-gasification of two or more carbonaceous feedstock, said process comprising: combusting a first carbonaceous feedstock having high calorific value with low ash and high hydrogen content, in presence of steam, with an amount of oxygen to produce a heated effluent; carrying the heated effluent to a moving bed reactor wherein said heated effluent reacts with a second carbonaceous feedstock, having low calorific value with high ash and low hydrogen content, to produce synthesis gas.

Still another embodiment of the present invention provides a process for co-gasification of two or more carbonaceous feedstock, said process comprising: combusting a first carbonaceous feedstock having high calorific value with low ash and high hydrogen content, in presence of steam, with an amount of oxygen to produce a heated effluent; carrying the heated effluent to a up-draft moving bed reactor wherein said heated effluent reacts with a second carbonaceous feedstock, having low calorific value with high ash and low hydrogen content, to produce synthesis gas.

Further, an embodiment of the present invention provides a process for co-gasification of two or more carbonaceous feedstock, said process comprising: combusting a first carbonaceous feedstock having high calorific value with low ash and high hydrogen content, in presence of steam, with an amount of oxygen to produce a heated effluent; carrying the heated effluent to a down-draft moving bed reactor wherein said heated effluent reacts with a second carbonaceous feedstock, having low calorific value with high ash and low hydrogen content, to produce synthesis gas.

Yet another embodiment of the present invention provides a process for the co-gasification of two or more carbonaceous feedstock, said process comprising: combusting a first carbonaceous feedstock having high calorific value with low ash and high hydrogen content, in presence of steam, with an amount of oxygen to produce a heated effluent; carrying the heated effluent radially into moving bed reactor wherein said heated effluent reacts with a second carbonaceous feedstock, having low calorific value with high ash and low hydrogen content, to produce synthesis gas.

The present invention also provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with an amount of oxygen to produce a heated effluent; carrying the heated effluent to a second reactor; and gasifying a second carbonaceous feedstock having low calorific value, with high ash and low hydrogen content, in the second reactor wherein the heated effluent reacts with the second carbonaceous feedstock to produce synthesis gas.

An embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with an amount of oxygen to produce a heated effluent; separating carbon particles from the heated effluent; recycling the separated carbon particles to the first reactor; carrying the heated effluent to a second reactor; and gasifying a second carbonaceous feedstock having low calorific value, with high ash and low hydrogen content, in the second reactor wherein the heated effluent reacts with the second carbonaceous feedstock to produce synthesis gas.

Another embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with an amount of oxygen to produce a heated effluent; separating carbon particles from the heated effluent by a cyclone separator; recycling the separated carbon particles to the first reactor; carrying the heated effluent to a second reactor; and gasifying a second carbonaceous feedstock having low calorific value, with high ash and low hydrogen content, in the second reactor wherein the heated effluent reacts with the second carbonaceous feedstock to produce synthesis gas.

Yet another embodiment of the present invention provides a process for co-gasification of two or more carbonaceous feedstock, said process comprising: combusting a first carbonaceous feedstock having high calorific value with low ash and high hydrogen content, selected from the group consisting of Petcoke, low ash Coal, Natural gas, Liquefied petroleum gas, coal and oil emulsions or mixtures thereof, in a first reactor selected from a fluid bed reactor or an entrained bed reactor, at a temperature in the range of 800 deg C. to 2000 deg C. and pressure in the range of 1 bar to 100 bar in presence of steam with an amount of oxygen to produce a heated effluent; carrying the heated effluent to a second reactor; and gasifying a second carbonaceous feedstock having low calorific value, with high ash and low hydrogen content, in the second reactor wherein the heated effluent reacts with the second carbonaceous feedstock to produce synthesis gas.

Still another embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with an amount of oxygen to produce a heated effluent; carrying the heated effluent to a second reactor; and gasifying a second carbonaceous feedstock having low calorific value, with high ash and low hydrogen content, which is selected from the group consisting of Indian Coal, high ash coal and Biomass or mixtures thereof, in the second reactor wherein the heated effluent reacts with the second carbonaceous feedstock to produce synthesis gas.

Further an embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with stoichiometric oxygen (carbonaceous feedstock/oxygen), or slightly excess amount than stoichiometric oxygen to produce a heated effluent; carrying the heated effluent to a second reactor; and gasifying a second carbonaceous feedstock having low calorific value, with high ash and low hydrogen content, in the second reactor wherein the heated effluent reacts with the second carbonaceous feedstock to produce synthesis gas.

Another embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with an amount of oxygen, which is preheated at a temperature in the range of 200 deg C. to 400 deg C., to produce a heated effluent; carrying the heated effluent to a second reactor; and gasifying a second carbonaceous feedstock having low calorific value, with high ash and low hydrogen content, in the second reactor wherein the heated effluent reacts with the second carbonaceous feedstock to produce synthesis gas.

Still another embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 900 deg C. to 1800 deg C. and pressure in the range of 1 bar to 100 bar in presence of steam with an amount of oxygen to produce a heated effluent; carrying the heated effluent to a second reactor; and gasifying a second carbonaceous feedstock having low calorific value, with high ash and low hydrogen content, in the second reactor wherein the heated effluent reacts with the second carbonaceous feedstock to produce synthesis gas.

Yet another embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 10 bar to 90 bar in presence of steam with an amount of oxygen to produce a heated effluent; carrying the heated effluent to a second reactor; and gasifying a second carbonaceous feedstock having low calorific value, with high ash and low hydrogen content, in the second reactor wherein the heated effluent reacts with the second carbonaceous feedstock to produce synthesis gas.

Another embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with an amount of oxygen to produce a heated effluent; carrying the heated effluent to a fluid bed reactor; and gasifying a second carbonaceous feedstock having low calorific value, with high ash and low hydrogen content, in the fluid bed reactor wherein the heated effluent reacts with the second carbonaceous feedstock to produce synthesis gas.

Another embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with an amount of oxygen to produce a heated effluent; carrying the heated effluent to a moving bed reactor; and gasifying a second carbonaceous feedstock having low calorific value, with high ash and low hydrogen content, in the moving bed reactor wherein the heated effluent reacts with the second carbonaceous feedstock to produce synthesis gas.

Another embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with an amount of oxygen to produce a heated effluent; carrying the heated effluent to a up-draft moving bed reactor; and gasifying a second carbonaceous feedstock having low calorific value, with high ash and low hydrogen content, in the up-draft moving bed reactor wherein the heated effluent reacts with the second carbonaceous feedstock to produce synthesis gas.

Still another embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with an amount of oxygen to produce a heated effluent; carrying the heated effluent to a down-draft moving bed reactor; and gasifying a second carbonaceous feedstock having low calorific value, with high ash and low hydrogen content, in the down-draft moving bed reactor wherein the heated effluent reacts with the second carbonaceous feedstock to produce synthesis gas.

Yet another embodiment of the present invention provides a process for co-gasification of two or more carbonaceous feedstock, said process comprising: combusting a first carbonaceous feedstock having high calorific value with low ash and high hydrogen content, in a first reactor selected from a fluid bed reactor or an entrained bed reactor, at a temperature in the range of 800 deg C. to 2000 deg C. and pressure in the range of 1 bar to 100 bar in presence of steam with an amount of oxygen to produce a heated effluent; carrying the heated effluent to a moving bed reactor wherein the heated effluent is introduced radially into the moving bed reactor; and gasifying a second carbonaceous feedstock having low calorific value, with high ash and low hydrogen content, in the moving bed reactor wherein the heated effluent reacts with the second carbonaceous feedstock to produce synthesis gas.

The present invention further provides a process for gasification of carbonaceous feedstock, said process comprising: combusting petcoke in a fluid bed reactor at a temperature in the range of 800 deg C. to 1700 deg C. and pressure in the range of 1 bar to 100 bar, in presence of steam with an amount of oxygen, thereby producing a heated effluent; separating carbon particles from the heated effluent; and sending the separated carbon particles to the fluid bed reactor; carrying the heated effluent to a moving bed reactor; and gasifying Indian coal in the moving bed reactor wherein the heated effluent reacts with the Indian coal to produce synthesis gas.

The present invention also provides an apparatus for co-gasification of two or more carbonaceous feedstock, said apparatus comprising: a first reactor (3), having a first feedstock inlet port (1), a oxygen or air inlet port (2), a steam inlet port (9), a ash removal port (7), and a solid recycle port (6); a first cyclone separator (5) connected to the first reactor (3) through a first cyclone separator inlet port (4); a second reactor (16), having a second feedstock inlet port (10), and a ash removal port (15), wherein the second reactor is connected to the first cyclone separator (5) through a gaseous inlet port (8); and a second cyclone separator (12), having a fine particles removal port (13), and an effluent port (14), wherein the second cyclone separator is connected to the second reactor through a second cyclone separator inlet port (11).

An embodiment of the present invention provides an apparatus for co-gasification of two or more carbonaceous feedstock, said apparatus comprising: a first fluid bed reactor (3), having a first feedstock inlet port (1), a oxygen or air inlet port (2), a steam inlet port (9), a ash removal port (7), and a solid recycle port (6); a first cyclone separator (5) connected to the first reactor (3) through a first cyclone separator inlet port (4); a second reactor (16), having a second feedstock inlet port (10), and a ash removal port (15), wherein the second reactor is connected to the first cyclone separator (5) through a gaseous inlet port (8); and a second cyclone separator (12), having a fine particles removal port (13), and an effluent port (14), wherein the second cyclone separator is connected to the second reactor through a second cyclone separator inlet port (11).

Still another embodiment of the present invention provides an apparatus for co-gasification of two or more carbonaceous feedstock, said apparatus comprising: a first entrained bed reactor (3), having a first feedstock inlet port (1), a oxygen or air inlet port (2), a steam inlet port (9), a ash removal port (7), and a solid recycle port (6); a first cyclone separator (5) connected to the first reactor (3) through a first cyclone separator inlet port (4); a second reactor (16), having a second feedstock inlet port (10), and a ash removal port (15), wherein the second reactor is connected to the first cyclone separator (5) through a gaseous inlet port (8); and a second cyclone separator (12), having a fine particles removal port (13), and an effluent port (14), wherein the second cyclone separator is connected to the second reactor through a second cyclone separator inlet port (11).

Further, an embodiment of the present invention provides an apparatus for co-gasification of two or more carbonaceous feedstock, said apparatus comprising: a first reactor (3), having a first feedstock inlet port (1), a oxygen or air inlet port (2), a steam inlet port (9), a ash removal port (7), and a solid recycle port (6); a first cyclone separator (5) connected to the first reactor (3) through a first cyclone separator inlet port (4); a fluid bed reactor (16), having a second feedstock inlet port (10), and a ash removal port (15), wherein the second reactor is connected to the first cyclone separator (5) through a gaseous inlet port (8); and a second cyclone separator (12), having a fine particles removal port (13), and an effluent port (14), wherein the second cyclone separator is connected to the second reactor through a second cyclone separator inlet port (11).

Still another embodiment of the present invention provides an apparatus for co-gasification of two or more carbonaceous feedstock, said apparatus comprising: a first reactor (3), having a first feedstock inlet port (1), a oxygen or air inlet port (2), a steam inlet port (9), a ash removal port (7), and a solid recycle port (6); a first cyclone separator (5) connected to the first reactor (3) through a first cyclone separator inlet port (4); a moving bed reactor (16), having a second feedstock inlet port (10), and a ash removal port (15), wherein the second reactor is connected to the first cyclone separator (5) through a gaseous inlet port (8); and a second cyclone separator (12), having a fine particles removal port (13), and an effluent port (14), wherein the second cyclone separator is connected to the second reactor through a second cyclone separator inlet port (11).

Further, an embodiment of the present invention provides an apparatus for co-gasification of two or more carbonaceous feedstock, said apparatus comprising: a first reactor (3), having a first feedstock inlet port (1), a oxygen or air inlet port (2), a steam inlet port (9), a ash removal port (7), and a solid recycle port (6); a first cyclone separator (5) connected to the first reactor (3) through a first cyclone separator inlet port (4); a up-draft moving bed reactor (16), having a second feedstock inlet port (10), and a ash removal port (15), wherein the second reactor is connected to the first cyclone separator (5) through a gaseous inlet port (8); and a second cyclone separator (12), having a fine particles removal port (13), and an effluent port (14), wherein the second cyclone separator is connected to the second reactor through a second cyclone separator inlet port (11).

Yet another embodiment of the present invention provides an apparatus for co-gasification of two or more carbonaceous feedstock, said apparatus comprising: a first reactor (3), having a first feedstock inlet port (1), a oxygen or air inlet port (2), a steam inlet port (9), a ash removal port (7), and a solid recycle port (6); a first cyclone separator (5) connected to the first reactor (3) through a first cyclone separator inlet port (4); a down-draft moving bed reactor (16), having a second feedstock inlet port (10), and a ash removal port (15), wherein the second reactor is connected to the first cyclone separator (5) through a gaseous inlet port (8); and a second cyclone separator (12), having a fine particles removal port (13), and an effluent port (14), wherein the second cyclone separator is connected to the second reactor through a second cyclone separator inlet port (11).

Further an embodiment of the present invention provides an apparatus for co-gasification of two or more carbonaceous feedstock, said apparatus comprising: a first reactor (3), having a first feedstock inlet port (1), a oxygen or air inlet port (2), a steam inlet port (9), a ash removal port (7), and a solid recycle port (6); a first cyclone separator (5) connected to the first reactor (3) through a first cyclone separator inlet port (4); a moving bed reactor (16) in which the heated effluent is introduced radially, having a second feedstock inlet port (10), and a ash removal port (15), wherein the second reactor is connected to the first cyclone separator (5) through a gaseous inlet port (8); and a second cyclone separator (12), having a fine particles removal port (13), and an effluent port (14), wherein the second cyclone separator is connected to the second reactor through a second cyclone separator inlet port (11).

Figure 2:
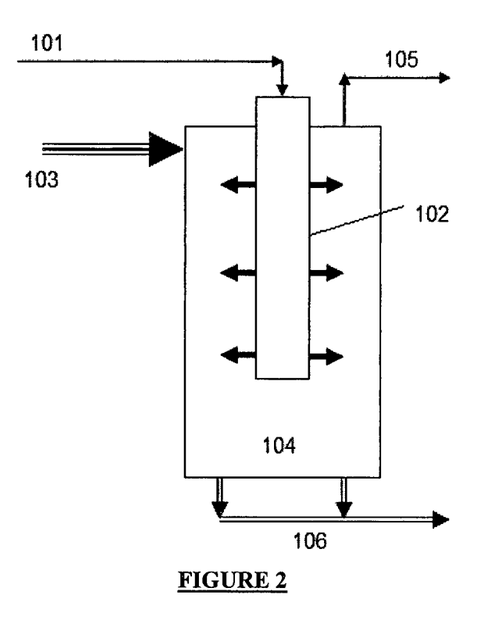
FIG. 2 is a schematic illustration of moving bed reactor where the heated effluent can be introduced radially. In this figure the reference numerals represents: inlet port (101), distributor (102), feedstock inlet port (103), reactor body (104), effluent port (105), and ash removal port (106).

The moving bed reactor (16) comprises: a feed stock inlet port (103); a distributor (102); an effluent port (105); and an ash removal port (106). The moving bed reactor is connected to the first reactor through an inlet port (101).

Figure 1:
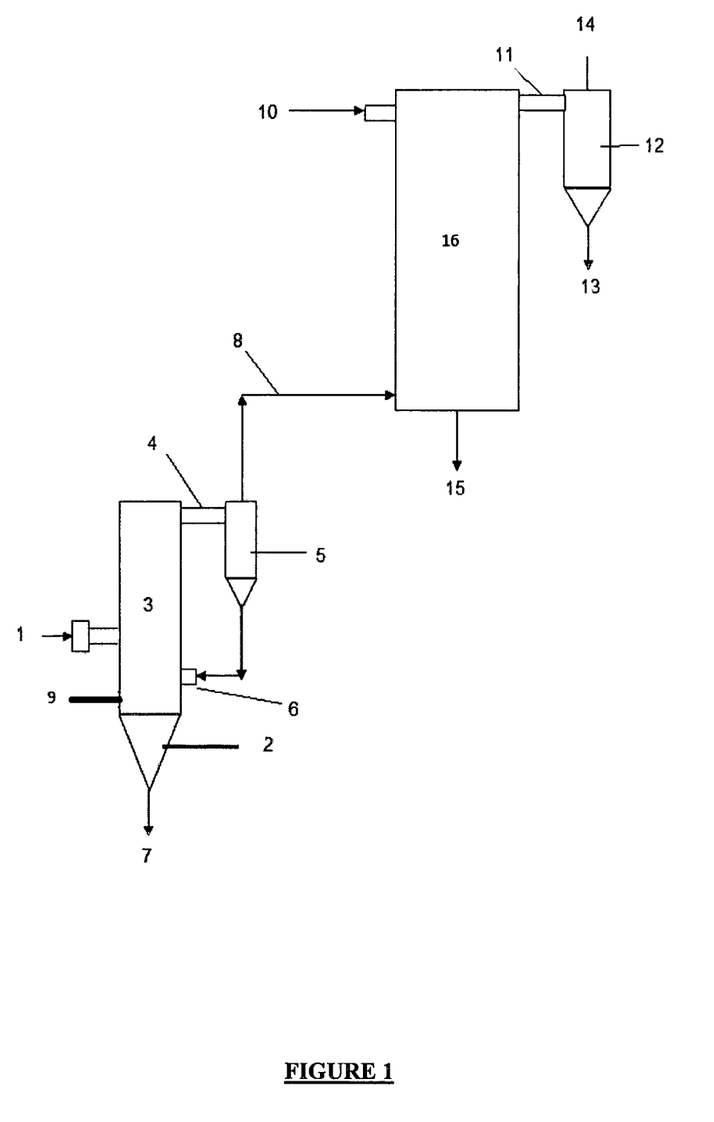

The apparatus of then present invention consists of two reactors wherein two or more types of carbonaceous feedstock can be processed based on their ash, hydrogen and calorific content. The feedstock for the first stage, fed through the inlet port (1) should preferably have higher calorific value, hydrogen content compared to the second stage feed through inlet port (10). Preferential combustion of this feed produces the required heat duty for meeting the heat demand of gasification with lower quantity of feedstock. The heat so generated by the combustion reaction is picked up by the steam which makes it superheated and carries it forward to the second stage of the apparatus. The hot steam reacts with the carbon content of the solid feedstock to produce syngas.

One embodiment of the present invention provides an apparatus for co-gasification of two or more carbonaceous feedstock. The apparatus generally comprises of two reactor sections, namely first stage and second stage. In the first stage carbonaceous feedstock which has highest calorific content preferably higher hydrogen and low ash content is used as the key heat source for overall gasification. This is combusted at high temperature in presence of excess steam and stoichiometric amount of oxygen. The un-reacted steam along with 1st stage product picks up the heat generated by combustion and moves forward to the second stage section either directly or through a cyclone separator for removing the fines. The hot gaseous effluents containing high amount of steam reacts with second stage feed and produces primarily CO and $H_2$ containing syngas. The sensible heat contributes in a major way for the endothermic gasification in second stage.

The temperature of the first stage section is maintained from 1000° C. to 1800° C. The pressure of the first stage section varies from 1 bar to 100 bars. Since the first stage operates at high temperature conditions, configuration systems such as fluid bed and entrained bed are more suitable. For efficient sensible heat utilization in second stage, configurations that provide plug flow environment for gas flow are more optimal. Although it is beneficial to utilize hydrogen rich, with minimal ash carbonaceous feedstock in first stage, depending on physical properties such as bulk crushing strength, hard grove index, the suitability of stage 1 or 2 can be judged in addition to other practical considerations.

The present invention also provides a process for two or more carbonaceous feedstock wherein the first reactor is separated into two zones through segregated feed injection, where in hydrogen rich feedstock is preferentially oxidized thus producing steam rich high temperature gasification reactants which will react with carbon rich feedstock. The other carbonaceous feedstock can be introduced co-axially or tangentially so that the preferential combustion reactions occur with higher calorific feedstock thus producing high temperatures in the core of the reactor. The heat transfer in radial direction can drive the endothermic gasification reactions.

Figure 3:
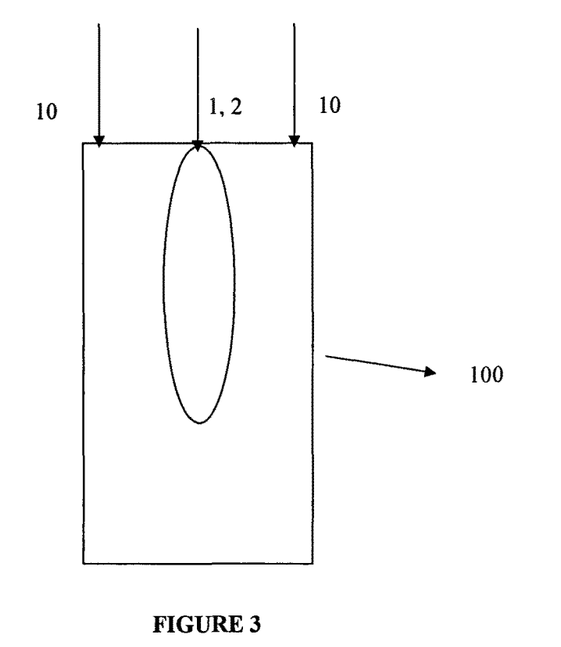
FIG. 3 is a schematic illustration of the process for co-gasification of two or more carbonaceous feedstock in a single reactor. In this figure the reference numerals represents: reactor (100), first carbonaceous feedstock feed inlet (1), oxidant inlet (2), and second carbonaceous feedstock inlet (10).

Further, the present invention can be practiced in a single reactor system as shown in FIG. 3. As described herein, the system consists of injection of feed through two or more feed nozzles. The reactor (100) consists of segregated feed nozzles through which high calorific fuel (1) along with stoichiometric oxidant (2) is injected in the centre of the reactor. The other low calorific fuel (10) is injected radially at a distance. The objective being to generate high temperature gaseous mixture in the centre of the reactor and transfer the combustion heat radially where the endothermic gasification reactions can take place.

Figure 4:
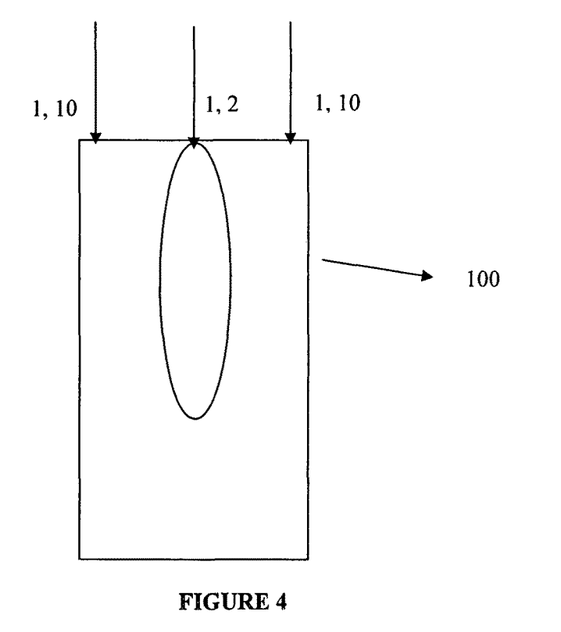
FIG. 4 is a schematic illustration of the process for co-gasification of two or more carbonaceous feedstock in a single reactor where the first carbonaceous feedstock is burnt at the centre. In this figure the reference numerals represents: reactor (100), first carbonaceous feedstock feed inlet (1), oxidant inlet (2), and second carbonaceous feedstock inlet (10).
Figure 5:
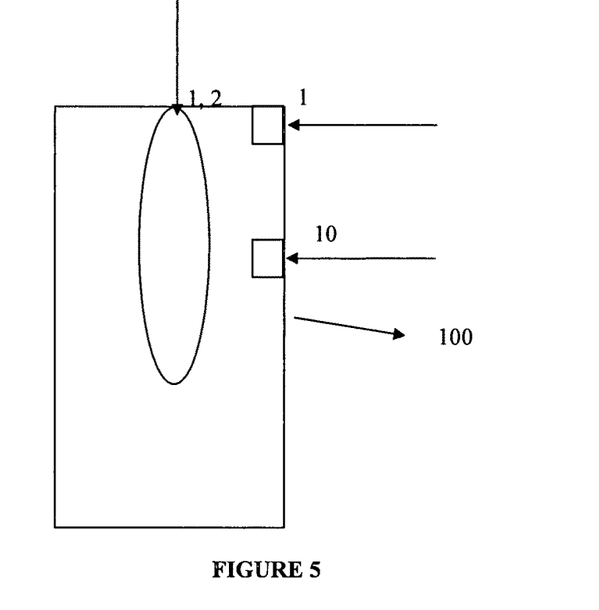
FIG. 5 is a schematic illustration of the process for co-gasification of two or more carbonaceous feedstock in a single reactor where segregated feeding arrangement is shown. In this figure the reference numerals represents: reactor (100), first carbonaceous feedstock feed inlet (1), oxidant inlet (2), and second carbonaceous feedstock inlet (10).

The other ways of performing the process of the present invention are shown in FIGS. 4 and 5. In FIG. 4, only stoichiometric amount of high calorific fuel (1) was burnt in the centre along with the oxidant (2), while the balance fuel was mixed with low calorific fuel (10). In FIG. 5, the segregated feeding arrangement is shown, so that the low reactivity issues pertaining to high calorific fuel such as pet coke can be better handled. The carbonaceous feedstock can be introduced either axially or tangentially so that the degree of mixing and temperatures are controlled for addressing any constraints on maximum allowable temperature, gasifier material etc.

The present invention works on the principle of formation of high temperature and steam, $CO_2$ rich gasification environment either in a single reactor or in two separate reactors. This is achieved through combustion of high calorific fuel stoichiometrically first with available oxygen within the practical limits and introducing the low calorific, high reactive fuels subsequently. Utilizing the same principle several combinations and arrangements can be devised.

The whole gasification process involves many reactions such as

Combustion Reactions $C+\frac{1}{2}O_2=CO-111$ MJ/Kmol $CO+\frac{1}{2}O_2=CO_2-283$ MJ/Kmol

$H2+\frac{1}{2}O_2=H_2O-242$ MJ/Kmol

Boudouard Reaction

$C+CO_2=2CO+172$ MJ/Kmol

The Water Gas Reaction, $C+H_2O=CO+H_2+131$ MJ/kmol

And the Methanation Reaction, $C+2H_2=CH_4+75$ MJ/kmol

It is evident from the above mentioned heat of reactions that one mole of oxygen reacting with hydrogen will give 25% more heat than reacting with carbon. Moreover, oxidation of hydrogen produces steam which further enhances the water gas reaction in the second stage. Similarly combustion of CO produces almost 2.5 times the energy release compared to CO production from C. Hence it makes sense to choose a feedstock which has higher hydrogen content and oxidize the inherent hydrogen present in it. Similarly complete combustion of carbon produces more heat than simple gasification.

Figure 6:
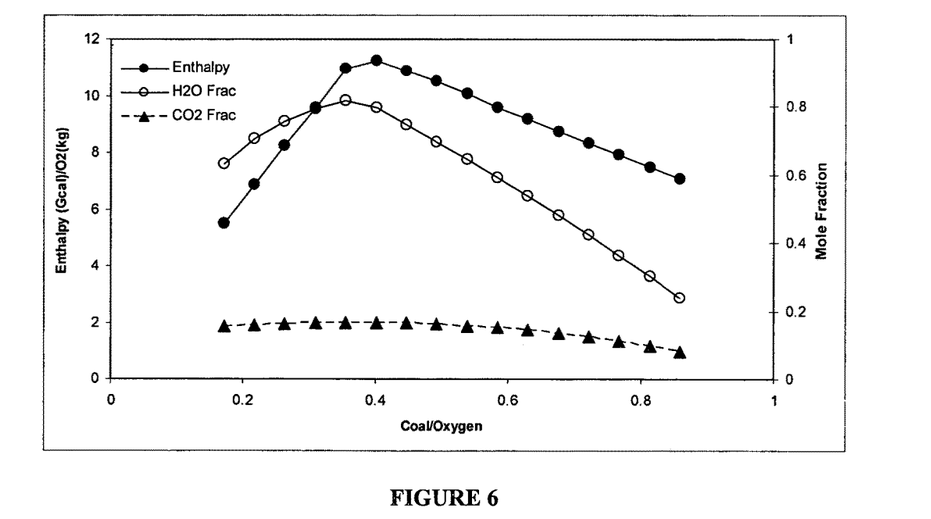
FIG. 6 presents the enthalpy and compositions of the product gas produced during oxidation of pet coke at different pet coke (carbon) to oxygen ratio.

This is illustrated through FIG. 6, where in the enthalpy and product gas compositions were presented at various carbon to oxygen ratio. Water was added to maintain the temperature constant (1800 degree C.). It could be noticed that the product gas enthalpy reaches maximum value when the input oxygen is close to stoichiometric amount. This is because the oxygen combusts the input carbon totally thus releasing all the calorific content of the fuel. The water and $CO_2$ fractions are close to their maximum level when fuel is completely burnt. In partial combustion/gasification mode CO and $H_2$ are present thus dilute the steam fraction. Since steam and $CO_2$ are the gasification agents it is preferable to have high concentrations of $H_2O$ and $CO_2$ along with high temperature environment. Burning the high calorific fuel preferably rich is hydrogen content and low in ash content helps in achieving this goal.

The general process of the present invention for the co-gasification of two or more carbonaceous feedstock comprises a stream of solid carbonaceous feedstock is fed through an inlet port (1) to the main reactor body of the first stage reactor. Gaseous feedstock consisting of preheated oxygen or air preferably at a temperature of 200-400 degree C. is fed to the first stage through the inlet port (2). The oxygen in the gaseous inlet stream (2) carries out combustion of the carbonaceous feedstock resulting in evolvement of heat. This heat is carried of by the steam injected through inlet port (9). The combustion reaction takes place at a temperature of 900-2000 degree C., more preferably at temperature 1100-1600 degree C. And this temperature is maintained by varying the flow rate of inlet stream (9). Hot effluent gases evolving from combustion first stage main reactor body (3) is transferred to first stage cyclone separator (5) through the cyclone inlet duct (4). Cyclone separator (5) separates the fines generated during the combustion and recycles it back to the main reactor body (3) through solid recycle port (6). The fines coming back to the main reactor through the recycle stream primarily contains unconverted carbon which comes in contact with oxygen and steam to produce syngas. The combustion reaction taking place in main reactor body (3) leaves behind ash particles which are removed from first stage reactor through ash removal port (7). The hot effluent from the first stage cyclone separator leaves the first stage reactor and enters the main reactor body of second stage reactor (16) through the second stage inlet duct (8). The second stage reactor has a solid feedstock inlet port (10) through which carbonaceous feedstock is fed to the main reactor body of the second stage reactor (16). The hot effluent of first stage which primarily contains steam at a very high temperature passes through the bed of solid carbonaceous material and thereby gasifying them to produce syngas of very high quality. The high temperature steam gasification of the solids inside the reactor body results in the formation of ash, which is drawn off the reactor through ash removal port (15). Hot syngas leaves the main reactor body to the second stage cyclone separator (12) through cyclone inlet duct (11). Fine unconverted particles are separated from the effluent gases by the second stage cyclone separator and removed through the removal port (13). Hot syngas leaves the system through effluent port (14).

The calorific value or heating value of the different fuels used in the present invention is calculated based on the following formula (Channiwal and Parikh 2002)

Highest Heating Value (HHV) in MJ/kg=34.91*C+117.83*H−10.34*O−1.51*N+10.05*S−2.11*Ash.

EXAMPLES

The following examples are given by way of illustration of the present invention and should not be construed to limit the scope of present disclosure. It is to be understood that both the foregoing general description and the following detailed description are exemplary and explanatory only and are intended to provide further explanation of the claimed subject matter.

Example 1

In this example the oxidation (combustion) results of pet coke, low ash coal, Indian coal and Biomass were presented at optimal feed to oxygen ratios, where in the enthalpy being carried by the product gases is maximum. The temperature was maintained at 1800 C by injecting the water.

TABLE 1

| Property | Pet Coke | Low ash Coke | Indian Coal | Biomass |
|---|---|---|---|---|
| Moisture | 0 | 2.4 | 4.7 | 10.0 |
| Fixed Carbon (d.b.) | 88 | 54.5 | 39.4 | 16.7 |
| Volatile Matter | 11.5 | 37.5 | 27.6 | 81.5 |
| Ash | 0.5 | 8.0 | 28.3 | 1.8 |
| Ultimate Analysis | | | | |
| C | 85 | 77.7 | 51.22 | 49.6 |
| H | 5.8 | 5.0 | 3.9 | 6.0 |
| O | 1.7 | 6.2 | 15.28 | 42.2 |
| N | 1.5 | 1.5 | 1 | 0.3 |
| S | 5.5 | 1.6 | 0.3 | 0.1 |
| Ash | 0.5 | 8.0 | 28.3 | 1.8 |
| Higher Heating Value (HHV) MJ/kg (moisture free) | 36.85 | 32.34 | 19.99 | 17.95 |
| Feedstock/Oxygen (kg/kg) | 0.401 | 0.447 | 0.712 | 0.847 |
| Feedstock/Oxygen (Kg/kg) (Stochiometric ratio) | 0.367 | 0.425 | 0.689 | 0.806 |
| Gas Yield/feedstock (kg/kg) | 8.74 | 7.705 | 4.445 | 3.055 |
| Gas yield/Oxygen (kg/kg) | 3.51 | 3.44 | 3.17 | 2.59 |
| Gas Composition (mole %) | | | | |
| $H_2O$ | 79.71 | 80.30 | 77.76 | 67.70 |
| $CO_2$ | 16.52 | 17.53 | 20.53 | 29.19 |
| CO | 1.61 | 0.95 | 0.82 | 2.03 |
| $H_2$ | 1.62 | 0.91 | 0.65 | 0.98 |
| Pressure (Bar) | 30 | 30 | 30 | 30 |
| Temperature (deg. C.) | 1800 | 1800 | 1800 | 1800 |

It can be noticed from the table that for unit amount of oxygen consumed the high calorific feed with low ash levels produces more gas that is rich in $H_2O$ and $CO_2$ content. Since more gas yield is associated with higher amounts of sensible heat, this results in higher mix temperatures during co-gasification. In addition, higher concentrations of $H_2O$, $CO_2$ along with higher mix temperatures accelerate the gasification reactions thus improving the overall carbon conversion and syngas production.

It can also be noticed from the table that the oxygen used was slightly lower than the stoichiometric oxygen for the combustion of the feedstock. Nevertheless, the optimal amount was almost 90% of the stiochiometric amount required. The optimal amount can vary (±10%) based on the type of feedstock, operating conditions used. Further, it is also clear from the table that the gas yield per unit oxygen consumption is significantly more for pet coke and low ash coal (high calorific value feedstock with low ash and high hydrogen content) than Indian coal and biomass (low calorific feedstock with high ash and low hydrogen content).

Example 2

20 kg/hr petcoke (high calorific value feedstock with low ash and high hydrogen content) and 80 kg/hr of Indian Coal (low calorific value feedstock with high ash and low hydrogen content) are co-gasified as per the process of the present invention. The operating scheme of which is shown in FIG. 2 and the results are highlighted in table 3. Petcoke is fed through the inlet (1) of $1^{st}$ stage gasifier whereas Indian Coal is fed through the inlet nozzle (10) of $2^{nd}$ stage gasifier.

The properties of the carbonaceous feedstock used in the process are given below in table 2.

TABLE 2

Typical properties of carbonaceous feedstock used in the example

| Property | Indian Coal | Petcoke |
|---|---|---|
| Carbon Content (wt %) | 50% | 88% |
| Ash content (wt %) | 20-30% | 0.5-2% |
| Hydrogen content (wt %) | 3-5% | 5-8% |
| Gross Calorific value (kcal/kg) (as received) | 3000-4500 | >9000 |
| | 12-21 (MJ/kg) | >35 (MJ/kg) |
| Sulfur content % wt | 0.2-0.8% | 3-6% |

TABLE 3

| Parameters | $1^{st}$ Stage | $2^{nd}$ Stage |
|---|---|---|
| Indian Coal (kg/hr) | — | 80 |
| Pet coke (kg/hr) | 20 | — |
| Carbon feedstock/$O_2$ (kg/kg) | 0.43 | $7.80 \times 10^4$ |
| $H_2O$/Carbon in feedstock (kg/kg) | 8.72 | 6.65 |
| Steam/$O_2$ ratio (kg/nm3) | 2.78 | $3.79 \times 10^5$ |
| Pressure (Bar) | 24 | 24 |
| Reactor Temperature ° C. | 1400 | 700 |
| $H_2$/CO ratio | 5.43 | |
| Yield of syngas(CO + $H_2$) (L/kg of Oxygen) | 2875 | |
| HHV of syngas (kcal/kg) | 11782 | |

Example 3

The gasification of single feedstock (Indian Coal) is carried by using the process of the present invention. 100 kg/hr is feed in the apparatus of the present invention. The feedstock parameters are same as that mentioned in the Table 2 above.

The result of the process using single feedstock is given in the table 4 below. Table 4 also compares the performance of the present scheme with an operating case where only Indian coal is chosen as feedstock with an operating case where two different feedstocks are used.

TABLE 4

| Parameters | Example 3 | Example 2 |
|---|---|---|
| Indian Coal (kg/hr) | 100 | 80 |
| Pet coke (kg/hr) | — | 20 |
| Carbon feedstock in first stage/$O_2$ (kg/kg) | 0.65 | 0.43 |
| $H_2O$/Carbon in all feedstock (kg/kg) | 0.67 | 4.64 |
| Steam/$O_2$ ratio (kg/nm$^3$) | 1.59 | 4.79 |
| Yield of syngas(CO + $H_2$) (L/kg of Oxygen) | 2194 | 2875 |
| Pressure (Bar) | 24.00 | 24.00 |
| $H_2$/CO ratio | 2.4 | 5.4 |
| HHV of syngas (kcal/kg) | 9798 | 11782 |
| Temperature range in reactors (deg C.) | 700-1400 | 700-1400 |

It is evident from the comparative study of the results from table 4 that the yield of syngas produced by the co-gasification of pet coke and Indian coal by the process of the present invention is significantly more than the yield of syn gas produced by the gasification of Indian coal only. It can also be concluded that the calorific value of the syn gas produced by the co-gasification of pet coke and Indian coal by the process of the present invention is significantly more than the calorific value of the syn gas produced by the gasification of Indian coal only.

Example 4

80 kg/hr of Indian coal and 20 kg/hr of petcoke is first mixed together and the mixture (mixed feed) and the said mixture is split into two parts with weight ratio of 1:4. This was co-gasified as per the process of the present invention as per the disclosed operating scheme.

The result of this process is compared in Table 5 with the results of Example 2 where only the pet coke was fed to the 1$^{st}$ stage while the high ash Indian coal was gasified in 2$^{nd}$ stage.

TABLE 5

| Parameters | Example 4 | Example 2 |
|---|---|---|
| Carbon in first stage feedstock/O2 (kg/kg) | 0.43 | 0.43 |
| H2O/Carbon feedstock (kg/kg) | 3.69 | 4.64 |
| Steam/O2 ratio (kg/nm3) | 3.94 | 4.79 |
| Yield of syngas (L/kg Oxygen) | 2630 | 2875 |
| Pressure (Bar) | 24 | 24.00 |
| H2/CO ratio | 4.39 | 5.4 |
| HHV of syngas (kcal/kg) | 10890 | 11782 |
| Temperature C. | 700-1400 | 700-1400 |

It is evident from table 5 that the yield of syn gas produced by the co-gasification of Indian coal and pet coke by the process of the present invention is significantly more as compared to the yield of syn gas produced by the gasification of mixed feed of Indian coal and pet coke. It is also evident from the table that the calorific value of the syn gas produce by the co-gasification of Indian coal and pet coke by the process of the present invention is significantly better than the calorific value of the syn gas produced by the gasification of mixed feed (Indian Coal+Pet coke).

Example 5

20 kg/hr pet coke was fed to the 1$^{st}$ stage while 80 kg/hr Biomass was gasified in 2$^{nd}$ stage (segregated feed) as per the process of the present invention as disclosed in the operating scheme. The properties of the feedstocks used in the present example are given below in Table 6. The result of the process is given below in table 7.

TABLE 6

| Property | Biomass | Petcoke |
|---|---|---|
| Carbon Content (wt %) | 49% | 88% |
| Ash content (wt %) | 0.2-2% | 0.5-2% |
| Hydrogen content (wt %) | 5-7% | 5-8% |
| Gross Calorific value (kcal/kg) (as received) | 3500-5000 / 14-21 | >9000 / >35 (MJ/kg) |
| Sulfur content % wt | <0.01 | 3-6% |

TABLE 7

| Parameters | 1$^{st}$ Stage | 2$^{nd}$ Stage |
|---|---|---|
| Pet Coke (kg/hr) | 20 | — |
| Biomass (kg/hr) | — | 80 |
| Carbon feedstock/O2 (kg/kg) | 0.43 | 7.8 × 10$^4$ |
| H2O/Carbon feedstock (kg/kg) | 8.64 | 3.76 |
| Steam/O2 ratio (kg/nm3) | 2.75 | 2.1 × 10$^5$ |
| Pressure (Bar) | 24 | 24 |
| Temperature C. | 700-1400 | 700-1400 |
| H2/CO ratio | 3.43 | |
| Yield of syngas (L/kg Oxygen) | 2163 | |
| HHV of Syngas (kcal/kg) | 12328 | |

Example 6

80 kg/hr of Biomass and 20 kg/hr of petcoke is first mixed together and the mixture (mixed feed) is formed, and the said mixture is split into two parts with weight ratio of 1:4. This was co-gasified as per the process of the present invention disclosed in the operating scheme. The result of this process is compared with result of process of Example 5 in Table 8.

TABLE 8

| Parameters | Example 6 | Example 5 |
|---|---|---|
| Carbon in first stage feedstock/O2 (kg/kg) | 0.43 | 0.43 |
| H2O/Carbon feedstock (kg/kg) | 1.50 | 2.65 |
| Steam/O2 ratio (kg/nm3) | 1.56 | 2.76 |
| Yield of syngas (L/kg Oxygen) | 1670 | 2168 |
| Pressure (Bar) | 24 | 24 |
| H2/CO ratio | 2.0 | 3.43 |
| HHV of Syngas (kcal/kg) | 8833 | 12328 |
| Temperature C. | 700-1400 | 700-1400 |

It is evident from table 8 that the yield of syn gas produced by the co-gasification of the biomass and pet coke by the process of the present invention is significantly more as compared to the yield of syn gas produced by the gasification of mixed feed of biomass and pet coke. It is also evident from the table that the calorific value of the syn gas produce by the co-gasification of biomass and pet coke by the process of the present invention is significantly better than the calorific value of the syn gas produced by the gasification of mixed feed (Biomass+Pet coke).

Although the subject matter has been described in considerable detail with reference to certain preferred embodiments thereof, other embodiments are possible. As such, the spirit and scope of the appended claims should not be limited to the description of the preferred embodiment contained therein.

We claim:

1. A process for co-gasification of two or more carbonaceous feedstock, said process comprising:
   completely combusting a first carbonaceous feedstock having high calorific value with low ash and high hydrogen content, in presence of steam, with an amount of oxygen to produce a heated effluent in a first reactor;

separating carbon particles from the heated effluent using a cyclone separator as the heated effluent travels from the first reactor to a second reactor, wherein the cyclone separator is connected to the first reactor via a cyclone separator inlet port and the second reactor is connected to the cyclone separator via a gaseous inlet port, and recycling the separated carbon particles to the first reactor; and carrying the heated effluent forward to the second reactor, wherein the heated effluent reacts with a second carbonaceous feedstock, having low calorific value with high ash and low hydrogen content, in the second reactor to produce synthesis gas; and wherein the first reactor and second reactor are separate vessels.

2. The process as claimed in claim 1, wherein the step of completely combusting the first carbonaceous feedstock occurs in the first reactor selected from a fluid bed reactor or an entrained bed reactor, at a temperature in the range of 800 degrees C. to 2000 degrees C. and pressure in the range of 1 bar to 100 bar in presence of steam with an amount of oxygen to produce the heated effluent.

3. The process as claimed in claim 2, wherein the second reactor is selected from a moving bed reactor or a fluid bed reactor.

4. The process as claimed in claim 3, wherein the heated effluent is introduced radially into the moving bed reactor.

5. The process as claimed in claim 3, wherein the moving bed reactor is selected from up-draft moving bed reactor, or down-draft moving bed reactor.

6. The process as claimed in claim 1, wherein the first carbonaceous feedstock having high calorific value with low ash and high hydrogen content is selected from the group consisting of Petcoke, low ash Coal, Natural gas, Liquefied petroleum gas, synthesis gas, coal and oil emulsions or mixtures thereof.

7. The process as claimed in claim 1, wherein the second carbonaceous feedstock having low calorific value with high ash and low hydrogen content is selected from the group consisting of Indian Coal, high ash coal and Biomass or mixtures thereof.

8. The process as claimed in claim 1, wherein the amount of oxygen used in the combustion of first carbonaceous feedstock having high calorific value with low ash and high hydrogen content, is stoichiometric oxygen or ±5 to ±20% by weight than the stoichiometric oxygen.

9. The process as claimed in claim 1, wherein the oxygen is preheated at a temperature in the range of 200 degrees C. to 400 degrees C.

10. The process as claimed in claim 1, wherein the combustion of first carbonaceous feedstock having high calorific value with low ash and high hydrogen content is carried out at a temperature in the range of 900 degrees C. to 1800 degrees C.

11. The process as claimed in claim 1, wherein the combustion of first carbonaceous feedstock having high calorific value with low ash and high hydrogen content is carried out at a pressure in the range of 1 bar to 90 bar.

12. The process as claimed in claim 1, wherein the heated effluent comprises heat, super heated steam and hot gases.

* * * * *